Patented July 20, 1926.

1,593,081

UNITED STATES PATENT OFFICE.

HANS JORDAN, OF BERLIN-STEGLITZ, GERMANY, ASSIGNOR TO THE FIRM: CHEMISCHE FABRIK AUF ACTIEN (VORM. E. SCHERING), OF BERLIN, GERMANY.

DIHYDROXY DIPHENYL METHANE COMPOUNDS.

No Drawing. Application filed September 8, 1925, Serial No. 55,153, and in Germany September 20, 1924.

My invention refers to new chemical products and to the process of making same. It more particularly relates to hydrogenated dihydroxy diphenyl methane compounds corresponding to the formula

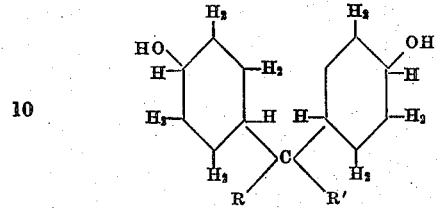

wherein R and R' can be either two identical or two different alkyl or aryl radicals. The term "phenyl" is meant to comprise also the ortho-alkyl substitution products of phenol such as for instance ortho cresol, so that the above formula is meant to comprise also compounds corresponding to the formula

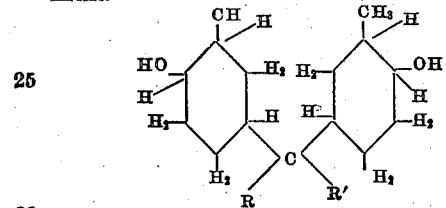

The new compounds are viscous oils which, being distinguished by a mild, highly agreeable fragrance, are adapted amongst others for use in the preparation of perfumes, but they can also be useful as intermediate products for the production of compounds which are adapted for other technical and therapeutical uses. They are prepared by acting with hydrogen in the presence of a catalyst on condensation products from ketones and phenols (incl. the ortho alkyl substitution products of phenols) until 12 atoms of hydrogen have entered into combination. As a catalyst I employ for instance nickel, colloidal palladium or platinum black.

In practising my invention I may proceed for instance as follows:

Example 1.

100 parts by weight of para dihydroxy diphenyl dimethyl methane, being a condensation product from acetone and phenol (Berichte der Deutschen Chemischen Gesellschaft 25, page 334, abstracts) are treated at about 50° C. with hydrogen in the presence of 5 parts of colloidal palladium. When 12 atoms of hydrogen have entered into combination no further absorption can be ascertained. By isolating the product of reaction I obtain di-4-hydroxy cyclohexanyl dimethyl methane, being a viscous oil boiling at 102–106° under 12 mms. pressure and having the scent of lilies-of-the-valley.

The comparatively wide range of boiling points results from the formation of 3 isomers which can be separated from each other by repeated, very careful fractional distillation. These 3 isomers, one of which has the character of a cis-cis, the second of a cis-trans and the third of a trans-trans compound, can be illustrated by the following formulæ

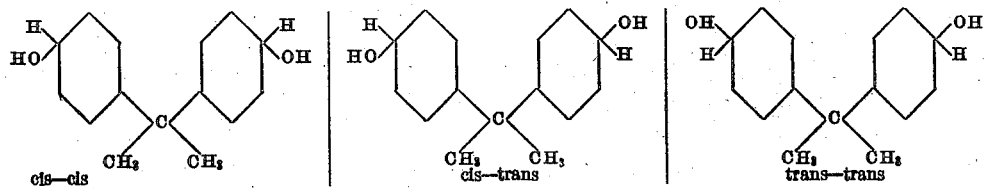

in which all unimportant details are left out.

Example 2.

100 parts by weight of 4-dihydroxy-3-dimethyl diphenyl dimethyl methane (see page 24 of Unverzagt's dissertation published in 1904 at Marburg and entitled: "Ueber die Einwirkung von Brom auf Dipara-oxytolyl-dimethylmethan") are treated with hydrogen under pressure in an autoclave at 150–170° in the presence of 2–5 parts of a nickel catalyst, until 12 atoms of hydrogen have entered into combination. The compound formed, viz di-4-hydroxy-3-methyl cyclohexanyl dimethyl methane, is a viscous, limpid oil boiling at 108–112° under 12 mms. pressure and having a very agreeable scent resembling hyacinths. The comparatively wide range of boiling temperatures is the result of the formation of cis-trans isomers, 10 of which can form theoretically.

By careful fractional distillation I have been able to obtain fractions which contain a high percentage of some of these isomers.

*Example 3.*

100 parts by weight of the condensation product of methyl ethyl ketone with phenol (Berichte der Deutschen Chemischen Gesellschaft vol. 25, page 334, abstracts) are treated in the presence of 2-5 parts of a nickel catalyst with hydrogen under pressure until 12 atoms of hydrogen have entered into combination. The product formed is di-4-hydroxy cyclohexanyl methyl ethyl methane, being a viscous oil having an agreeable, flowery smell which consists of a mixture of different stereo isomers and boils at 120-125° C. under 14 mms. pressure.

I wish it to be understood that the production of the new compounds is not limited to the exact proportions and operations described, for obvious modifications will occur to a person skilled in the art.

I claim:—

1. As a new product, a hydrogenated dihydroxy diphenyl methane compound corresponding to the formula

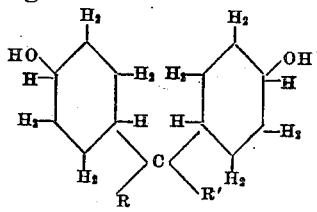

wherein R and R' are two identical or two different alkyl or aryl radicals and wherein the ortho-positions relative to the hydroxyl group can also be taken up by alkyl radicals, said compounds being distinguished by an agreeable fragrance reminding of flowers.

2. As a new product, a para hydrogenated dihydroxy diphenyl dimethyl methane compound corresponding to the formula

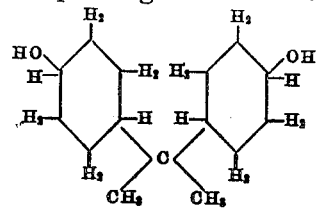

wherein the ortho-positions relative to the hydroxyl group can also be taken up by alkyl radicals.

3. As a new product, a di-4-hydroxy-3-methyl cyclo hexanyl dimethyl methane corresponding to the formula

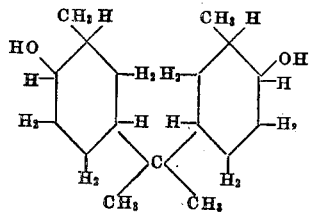

this compound being a limpid viscous oil of an agreeable fragrance reminding of flowers, boiling at 108-112° under 12 mms. pressure and consisting of different isomers.

4. The process of producing hydrogenated dihydroxy diphenyl methane compounds comprising acting with hydrogen in the presence of a catalyst on a condensation product from a ketone and a phenol until 12 hydrogen atoms have entered into combination.

5. The process of producing hydrogenated dihydroxy diphenyl methane compounds comprising acting with hydrogen in the presence of a catalyst on a condensation product from acetone and a phenol, until 12 hydrogen atoms have entered into combination.

6. The process of producing hydrogenated dihydroxy diphenyl methane compounds comprising acting with hydrogen in the presence of a catalyst on a condensation product from acetone and ortho cresol, until 12 hydrogen atoms have entered into combination.

7. The process of producing hydrogenated dihydroxy diphenyl methane compounds comprising acting with hydrogen in the presence of a nickel catalyst under pressure at a temperature of 150-170° on a condensation product from acetone and ortho cresol, until 12 atoms of hydrogen have entered into combination.

In testimony whereof I affix my signature.

HANS JORDAN.